(No Model.)
B. F. COON.
CULTIVATOR.
No. 493,398. Patented Mar. 14, 1893.
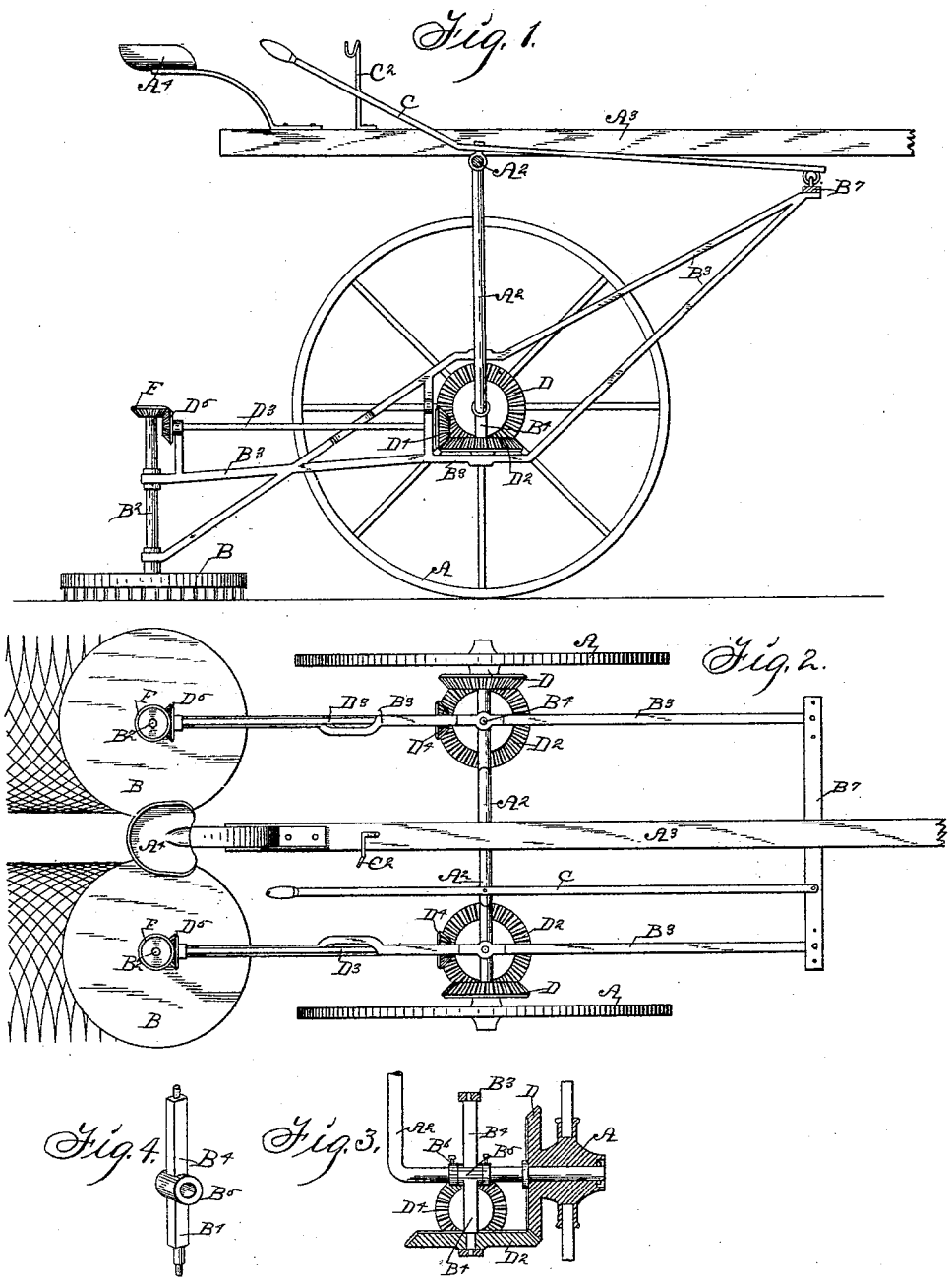
Witnesses:
W. J. Sankey.
J. Ralph Orwig.
Inventor: Benjamin F. Coon,
By Thomas G. Orwig, Attorney.

UNITED STATES PATENT OFFICE.

BENJAMIN F. COON, OF JAMAICA, IOWA.

CULTIVATOR.

SPECIFICATION forming part of Letters Patent No. 493,398, dated March 14, 1893.

Application filed October 24, 1892. Serial No. 449,751. (No model.)

*To all whom it may concern:*

Be it known that I, BENJAMIN F. COON, a citizen of the United States of America, residing at Jamaica, in the county of Guthrie and State of Iowa, have invented an Improvement in Cultivators, of which the following is a specification.

The objects of my invention are to impart and regulate motion, by gear or otherwise, from a drive or traction wheel to a wheel or hackle carrying teeth or knives through the ground thereby thoroughly pulverizing the soil, the said invention being specially adapted to the cultivation of corn, cotton or any other crop planted in rows or drills.

My object is further to provide convenient and easily operated means whereby the soil may be pulverized in close proximity to the plants without disturbing the same or covering them with the soil and to provide simple means whereby the depth to which the soil shall be worked may be readily adjusted by a person upon the driver's or operator's seat of the cultivator so that the roots of the plants will not be disturbed if they are close to the ground surface.

My invention consists in the construction, arrangement and combination of parts whereby the above results are accomplished as hereinafter set forth, pointed out in my claims, and illustrated in the accompanying drawings, in which—

Figure 1 is a vertical longitudinal sectional view of the complete cultivator through its approximate central portion. Fig. 2 is a top or plan view of the complete cultivator. Lines are shown in the path of the rotary harrows to indicate the movement of the harrow teeth. Fig. 3 is an enlarged detail view partly in section showing a portion of one of the traction wheels of the device, and a part of the axle, and the arrangement of the gear wheels and harrow supporting frame relative thereto, and Fig. 4 is an enlarged detail perspective view of one of the vertical shafts which support the harrow supporting frame.

Referring to the accompanying drawings, the reference letter A is used to designate the traction wheels of the device, and $A^2$ the axle thereof which is preferably arched in its central portion to pass over high plants. $A^3$ designates the tongue of the cultivator which is connected with said axle and has a driver's seat $A^4$ secured to its rear end portion.

B B designate rotary harrows each of which is provided with a vertical axle $B^2$ which have their bearings in the supporting frames $B^3 B^3$. These frames are connected with the axle by means of the vertical shafts $B^4 B^4$. In the central portion of each of these shafts is a bearing $B^5$ adapting them to be placed upon the axle $A^2$ and be capable of a slight rotary movement relative thereto. The ends of these shafts $B^4$ are adapted to be secured in the frames $B^3$ part of which passes above the axle and part beneath, as clearly shown in Fig. 1, and said shafts $B^4$ are held in proper position upon the axle by means of the adjustable collars $B^6$. The forward extremities of these frames $B^3 B^3$ are connected by means of the bar $B^7$ which has a pivotal and adjustable connection therewith. It will now be obvious that the said rotary harrow may be elevated, lowered or moved from one side to the other by means of power applied to the bar $B^7$, and it will also be seen that the distance between the harrows may be adjusted by changing the point of attachment of the frames with the bar $B^7$.

To provide for the convenient movement of the harrows as above stated I have provided a lever C mounted in convenient juxtaposition to the driving or operator's seat, fucrumed to the axle $A^2$ where it has a universal joint, and then pivotally attached to the said bar $B^7$.

$C^2$ designates a support for the said lever, fixed to the tongue and in such a position that the lever C when resting therein will hold the harrows B elevated above the ground surface.

Means are provided whereby the rotary harrows may be rotated by means of the traction wheels of the device as follows. The means for operating both harrows are alike so that but one will be described.

D designates a bevel gear wheel secured to the inner end portion of the hub of the traction wheel. $D^2$ is a like wheel in mesh therewith and mounted upon the vertical shaft $B^4$. $D^3$ designates a rotatable shaft having its bearings in the frame $B^3$, and having a bevel gear wheel fixed to each end, the forward one of which $D^4$ is in mesh with the wheel $D^2$ and the rear one $D^5$ is in mesh with a like wheel F which is fixed to the verticle axle $B^2$ of the rotary harrow B. The relative size of these wheels are preferably so arranged that the outer teeth of the harrow will not be moved either forwardly or backwardly in the line of advance, that is that the outer portion of the harrows will be rotated rearwardly about as fast as the device is advanced, while the inner portion of the harrows are rapidly advanced through the ground. This it will be obvious will pulverize the ground the less thoroughly in proportion to the distance from the plants thereby reducing the power required to operate the device to a minimum. It will be obvious also that the harrows will be rotated in opposite directions so that their inner ends will be moved forwardly.

Having thus described my invention, what I claim as new, and desire to secure by Letters Patent, is—

1. An improved cultivator, comprising a suitable carriage two frames extended longitudinally of the carriage, on opposite sides of its center and having universal connection therewith, a rotary harrow rotatably mounted in the rear end of each of the said frames, a bar pivotally and adjustably connected with the forward ends of said bars for the purposes stated, a lever having a universal connection with a suitable part of the carriage and a pivotal connection with said bar and means for rotating the said harrows with their inner ends moving forwardly, by means of power transmitted from the traction wheels of the said carriage.

2. An improved cultivator, comprising a suitable carriage, two harrow supporting frames extended longitudinally of the carriage on opposite sides of its center, a vertical shaft mounted upon the end portions of the axle of the traction wheels of the device, to rotate in a plane at right angles thereto, and having the said frames pivotally attached to their ends to produce a universally movable connection between said frame and the axle, a bevel gear wheel formed on or fixed to the inner end portion of each hub, a harrow rotatably mounted in the rear end of each of the said frames, and a train of gears mounted in each of said frames to transmit motion from the aforesaid gear wheel to the harrow and means for controlling the position of the harrows substantially as set forth for the purposes stated.

3. An improved cultivator comprising a suitable carriage, two rotary harrows each having a vertical axle, the supporting frames $B^3$ mounted on the vertical shafts $B^4$ which in turn are rotatably mounted upon the axle of the carriage, the bar $B^7$ pivotally and adjustably attached to the forward ends of the frame $B^3$, a lever C having a universal connection with axle of the traction wheels and a pivotal connection with the bar $B^7$ the support $C^2$ for the lever C, the bevel gear wheel D formed on or fixed to the inner ends of the traction wheels and a system of gears mounted in the said frames to transmit a rotary motion to the harrows with their inner edges moving forwardly from the gear wheels D substantially in the manner set forth for the purposes stated.

BENJAMIN F. COON.

Witnesses:
W. J. SANKEY,
THOMAS G. ORWIG.